United States Patent [19]

Meimberg et al.

[11] E Re. 28,871

[45] Reissued June 22, 1976

[54] PROCESS AND APPARATUS FOR SPINNING STAPLE FIBERS

[75] Inventors: Julius Meimberg, Muenster; Clemens Schlösser, Bremen, both of Germany

[73] Assignee: Rieter Machine Works, Ltd., Winterthur, Switzerland

[22] Filed: Sept. 5, 1974

[21] Appl. No.: 503,465

Related U.S. Patent Documents

Reissue of:

[64] Patent No.: 3,324,642
Issued: June 13, 1967
Appl. No.: 422,996
Filed: Jan. 4, 1965

[30] Foreign Application Priority Data

Jan. 8, 1964 Germany ..... 59477

[52] U.S. Cl. ..... 57/58.95
[51] Int. Cl.[2] ..... D01H 1/12
[58] Field of Search ..... 57/58.89–58.95, 57/2, 28, 29, 30, 90

[56] References Cited

UNITED STATES PATENTS

| | | | |
|---|---|---|---|
| 3,115,001 | 12/1963 | Cizek et al. | 57/58.91 |
| 3,119,223 | 1/1964 | Meimberg | 57/58.95 X |
| 3,126,697 | 3/1964 | Cizek et al. | 57/58.89 |
| 3,127,730 | 4/1964 | Pavek et al. | 57/58.95 X |
| 3,163,976 | 1/1965 | Juillard | 57/58.89 |
| 3,210,923 | 10/1965 | Schlosser | 57/58.95 |

FOREIGN PATENTS OR APPLICATIONS

| | | | |
|---|---|---|---|
| 227,580 | 5/1963 | Austria | 57/58.89 |
| 1,295,871 | 5/1962 | France | 57/58.89 |
| 477,259 | 12/1937 | United Kingdom | 57/58.95 |
| 969,046 | 9/1964 | United Kingdom | 57/58.95 |

*Primary Examiner*—Donald E. Watkins
*Attorney, Agent, or Firm*—Kenyon & Kenyon Reilly Carr & Chapin

[57] ABSTRACT

A process and apparatus for spinning staple fibers wherein a sliver is continuously delivered to a separation roller where individual fibers are separated from such sliver. The thus separated individual fibers are accelerated by means of an air current approximately to the peripheral velocity of the inner wall of a hollow body member, and then the individual fibers are delivered approximately tangentially to a quickly rotating hollow body member to form thereat a fiber ring, and finally, the yarn is axially withdrawn out of the fiber ring.

19 Claims, 4 Drawing Figures

PROCESS AND APPARATUS FOR SPINNING STAPLE FIBERS

Matter enclosed in heavy brackets [ ] appears in the original patent but forms no part of this reissue specification; matter printed in italics indicates the additions made by reissue.

The present invention has reference to an improved process and apparatus for spinning staple fibers. In so doing, a continuously delivered sliver or band is separated into individual fibers by means of a rotating separating roll or roller and the individual fibers are transported to the inner wall of a quickly rotating hollow body member, there collected and withdrawn as twisted yarn.

With a known spinning device operating in this manner the individual fibers are lead to the inner wall of a hollow body member in which there is located an annular groove provided with bores and inwardly directed needles. The fiber-air current coming from the separating roller is conducted through these bores located in the needle field. Such bores must be appropriately large and numerous in order to permit passage of a sufficient quantity of air. Since the fibers must also be collected upon the same surface there automatically occurs sucking-in of fibers into these bores. When this happens the fibers are fixedly held and can no longer be spun onto the existing yarn. Either these fibers are entrained from time to time, in which case there appear undesired thick locations at the yarn, or the bores become completely closed. In the latter case air no longer flows through these bores and the yarn becomes thinner and thinner until it breaks.

In the known spinning device the hollow body member rotates at a considerably higher speed than the separating roller. Consequently, it is not possible to prevent that the individual fibers floating in the air current or stream will be grasped by the newly formed yarn before they have assumed the speed of the hollow body member and have deposited upon the inner wall at the hollow body member provided with bores. They then build curls about the yarn which disadvantageously affect its tying together, its appearance as well as its strength.

It is to be appreciated the speed of rotation of the separation roller cannot be increased as desired, because the fibers must be carefully combed out of the delivered sliver without being torn. A shortening of the fibers would reduce the quality of the yarn to an undesired degree.

Accordingly, it is a primary object of the present invention to provide an improved process for the separation of fibers from the fiber-air mixture of a spinning device of the above-mentioned type while overcoming the disadvantages previously indicated.

A further important object of the present invention is directed to an improved apparatus for the spinning of fibers which enables to effectively separate the fibers from a fiber-air mixture so that the quality of the spun yarn is not impaired.

Another considerable object of the present invention relates to an improved spinning device incorporating a separation roller and a rotating hollow body member, and means disposed between said separation roller and hollow body member for accelerating a fiber-air mixture approximately to the peripheral speed of the aforesaid hollow body member.

The process contemplated according to the present invention incorporates the features of accelerating the individual fibers with the surrounding air — sometimes referred to herein as fiber-air current — during movement from the separation roller to the quickly rotating hollow body member approximately to the peripheral speed of such hollow body member, conducting the individual fibers together with the surrounding air to the inner wall of the hollow body member, such inner wall being provided with *a groove and* combing means, separating the individual fibers at this location from the entrained air current due to the centrifugal action, collecting and holding the fibers by the combing means until their withdrawal as a spun or completed yarn while deflecting and sucking-off the air current cleaned or freed of fibers.

The spinning device of the present invention employed for the execution of the aforementioned process, according to one inventive embodiment, is designed to accelerate the fibers by means of an accelerating roller arranged between a separation member, e.g., separation roller and a hollow body member, the aforesaid acceleration roller can be advantageously provided with air passage means and combing means. The peripheral speed of this acceleration roller is approximately as large as that of the hollow body member.

A further possibility for accelerating the fibers is based upon the feature of narrowing the cross-section of a communicating or connecting channel leading from the separation roller to the hollow body member, thereby achieving acceleration of the air current.

A further aspect of the present invention concerns itself with the guiding of the air in the hollow body member. Initially, the fiber-air current flowing-in with a high velocity is guided to the inner wall *forming a groove* of the quickly rotating hollow body member in order to be there deflected, cleaned or freed of fibers and then sucked-off. The individual fibers are thrown by the centrifugal action against the inner wall of the quickly rotating hollow body member, collect in the *groove with the* combing zone until the desired yarn thickness, remain lying there until they are spun onto the yarn which moves further with its withdrawal speed along the inner wall of the quickly rotating hollow body member.

Other features, objects and advantages of the present invention will become apparent by reference to the following detailed description and drawings wherein.

Figure 3:
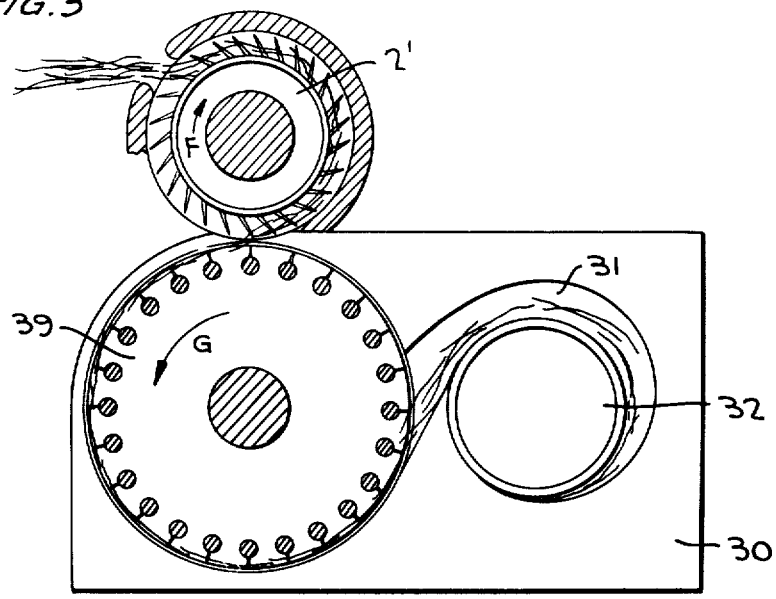
Figure 4:
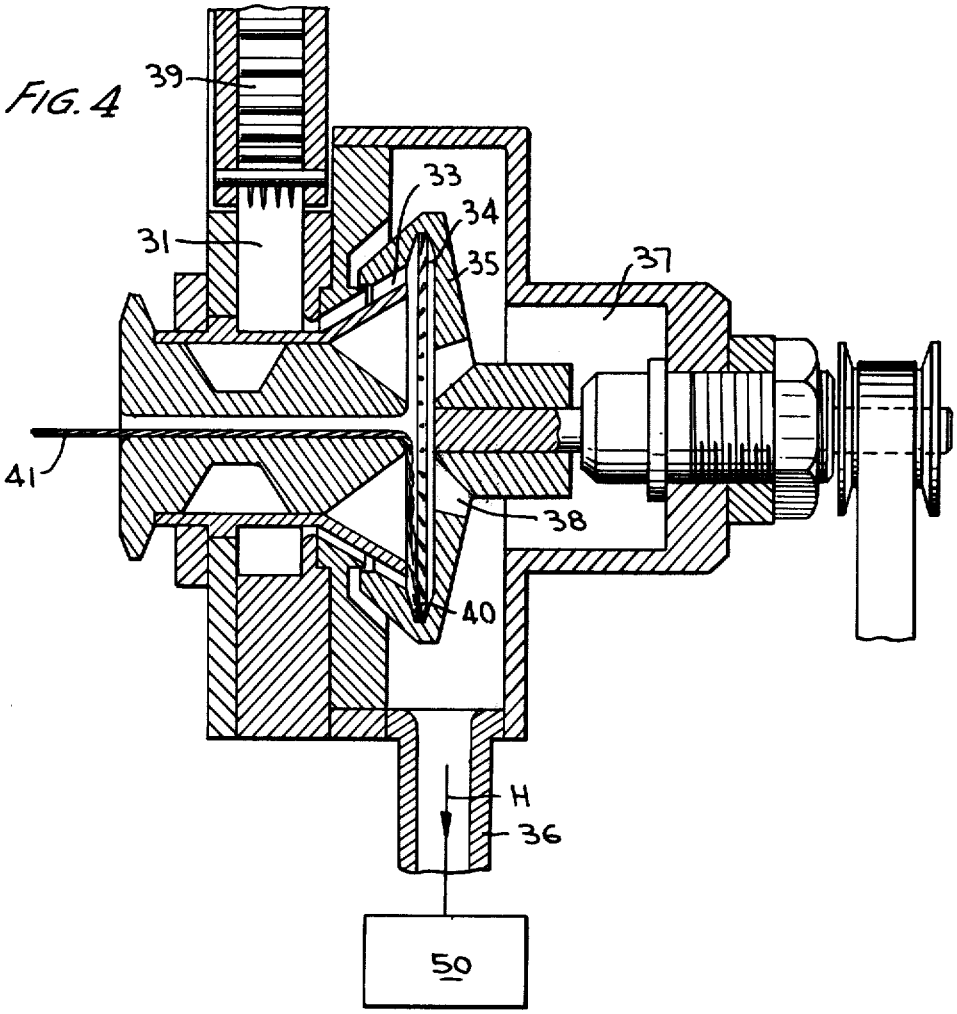

FIG. 3 is a side view of a further embodiment of spinning device showing details of the feed roller, separation roller and a connecting channel having a narrowing cross-section in the direction of the hollow body member; and FIG. 4 shows in cross-section details of the physical structure of an arrangement somewhat similar to FIG. 3, yet here incorporating a modified form of hollow body member with a central suction arrangement for a number of spinning devices.

Figure 1:
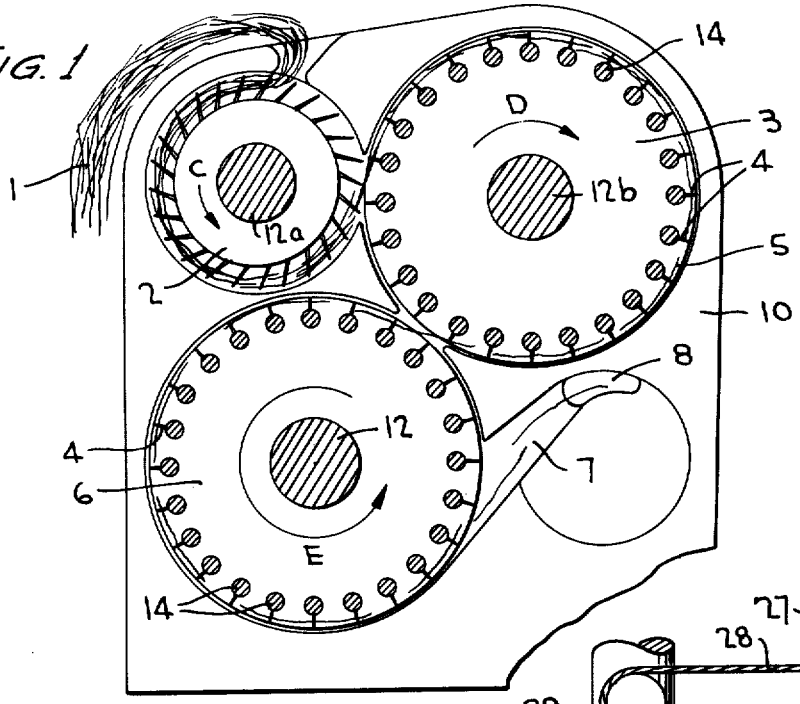
FIG. 1 is a side view in cross-section of the feed roller, the separation roller and the acceleration roller with communicating air channel.
Figure 2:
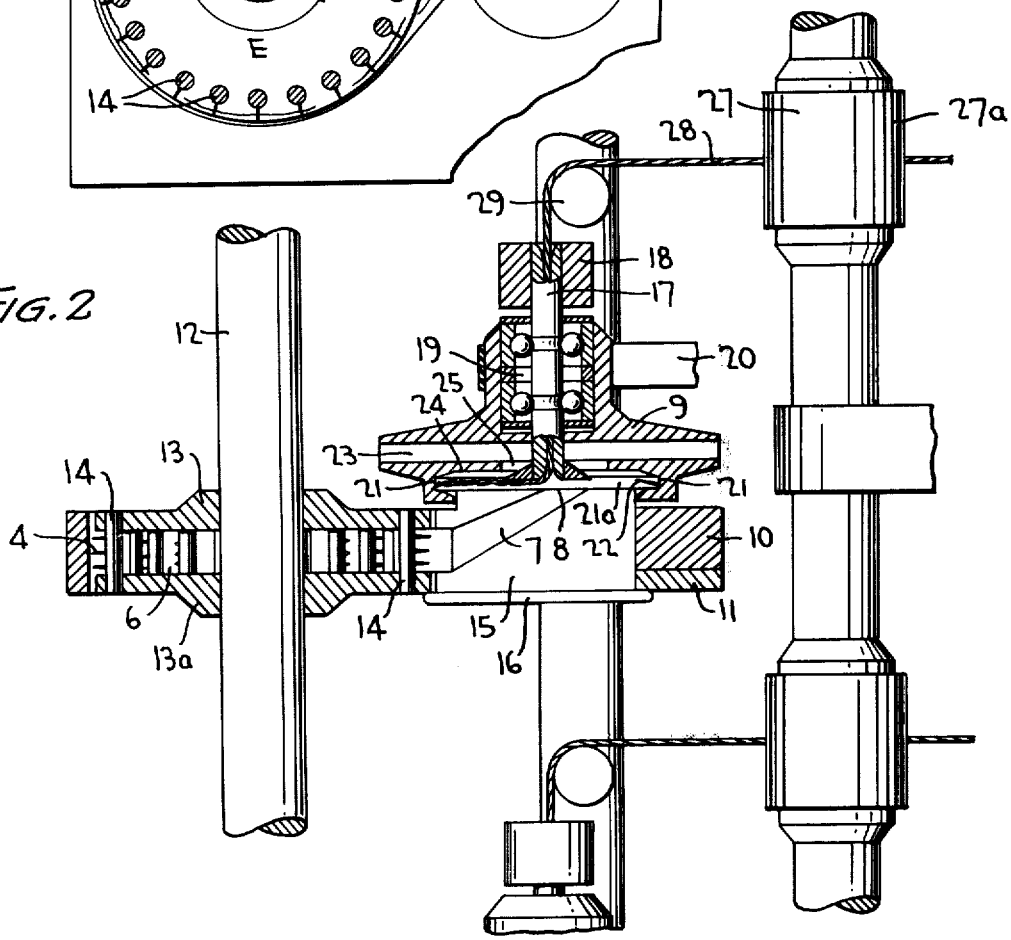
FIG. 2 is a plan view, partly in cross-section, of the acceleration roller, the hollow body member with *an air accelerating* blower means and the withdrawal rollers of the spinning device of FIG. 1.

Describing now the drawings, in the embodiment lepicted for purposes of illustration in FIGS. 1 and 2 a liver or band 1 is delivered by means of a feed porcupine roller 2 rotating in the direction of arrow C to a eparation roller 3 rotating at greater velocity in the lirection of arrow D. The separation roller 3 is provided with needles 4 which comb individual fibers 5 out of the *slow moving* sliver 1 and entrain such fibers in its lirection of movement. After the separation [ rollers ] *roller* 3 there is arranged an acceleration roller 6 revolving at a higher velocity. An air channel 7 merges angentially with [ an ] *a discharge* opening 8 provided at the inner wall of a hollow body member 9. It will be understood that the feed porcupine roller 2, the separation roller 3 and the acceleration roller 6 rotate within a housing which for reasons of fabrication is formed by the housing portion 10 and the cover member 11. The mentioned rollers are driven by shafts which drive a number of spinning devices. Thus, it will be seen the shaft 12 drives the acceleration roller 6, the shaft 12a the feed porcupine roller 2 and the shaft 12b the separation roller 3. Moreover, the separation roller 3 and the acceleration roller 6 are advantageously formed of the same members for reasons of fabrication. It will further be seen that such embody both flanges 13 and 13a and the needle runways or arms 14 provided with the needles 4 secured between the aforesaid flanges 13 and 13a.

The air channel 7 is disposed in a removal guide member or core 15. Such is laterally secured by a projecting edge or shoulder 16 *so that the air channel 7 is stationary*. The hollow body member 9 has its axis substantially parallely disposed with respect to the axes of the rollers arranged in the housing portion 10 and embraces the guide core 15. This hollow body member 9 is rotatably mounted by means of a bearing 19 upon a hollow shaft 17. This hollow shaft 17 in turn is connected at one end in a support 18. Moreover, the hollow body member 9 is driven contra the direction of rotation of the acceleration roller 6 through the agency of a belt 20. It will also be seen that in the wall of the hollow body member 9 there is located a substantially V-shaped, smooth walled, annular groove 21 for collecting the individual fibers 5. Forwardly directed needles 22 are mounted at the base of the annular groove 21. The compartment 21a surrounded by the annular groove 21 is separated by a frontal wall 24 from the air ducts or channels 23 of the hollow body member 9 functioning as *an air accelerating* blower means. This frontal wall 24 is provided with an opening 25 through which extends the hollow shaft 17 with a guide disk 26. *The frontal wall 24 serves as one wall of the annular groove 21 and extends inwardly towards the axis of rotation of the hollow body member 9.*

If the spinning device depicted in FIGS. 1 and 2 is placed into operation then such works as follows: The feed porcupine roller 2 steadily delivers a sliver or band 1 *at low speed*. Individual fibers 5 are continuously combed out of the sliver 1 by means of the needles 4 of the quicker rotating separation roller 3. The thus combed out individual fibers are entrained in the direction of movement of the separation roller 3 indicated by reference character D. The blower action of the air channels 23 generates an air suction current which moves through the intermediate spaces between the needle runways or arms 14 of the acceleration roller 6 and the separation roller 3. This air suction current or stream loosens the individual fibers 5 from the needles 4 of the separation roller 3 and transmits them to the acceleration roller 6 revolving at a very high velocity.

The different lengths of the arrows C, D and E signifies that the corresponding rollers move with different high velocities. In reality, the increase of the number of revolutions is larger and a multiple of the previously arranged roller. The peripheral speed of the acceleration roller 6 completely or approximately corresponds to that of the hollow body member 9. The moving needle runways 14 also exert a blower effect, so that the accelerated individual fibers 5 together with the air current are transported via the air channel 7 *through the discharge opening 8 and discharged into the groove 21 from a side opposite the frontal wall 24* against the frontal wall 24 and into the annular groove 21 of the hollow body member 9. The fiber-air current flows with a velocity which completely or approximately corresponds to the peripheral speed of the annular groove 21 against the aforesaid annular groove 21 of the hollow body member 9. By way of example, with a circumference of this annular groove 21 of 30 centimeters and a speed of rotation of the hollow body member 9 of 30,000 r.p.m. the peripheral speed of the annular groove 21 and the flow velocity of the fiber-air current amounts to 9,000 meters per minute. Due to the centrifugal action the fibers glide in the annular groove 21 *and* are deposited fiber for fiber [ between the needles 22 ] until the desired yarn thickness is achieved. The air current cleaned or freed of fibers is deflected in the axial direction of the hollow body member 9 and flows into the surroundings through the opening 25 and the air ducts or channels 23, or into a non-illustrated suction conduit. In addition to the air current which guides the fibers in the hollow body member 9, air is also sucked through the hollow shaft 17. If a joining yarn is held in front of the opening of the hollow shaft 17 then such is seized by the secondary air stream and sucked into the hollow body member 9. There it is immediately placed into rotation by the air current so that the forward end of such joining yarn is thrown into the annular groove 21 where it is twisted onto the there collected fibers by virtue of the rotation of the hollow body member 9. In so doing, the guide disk or plate 26 prevents that the joining yarn is sucked into the opening 25.

If the joining yarn is now placed between the rollers 27a of the delivery device 27 then this yarn pulls the collected fibers over the backs of the forwardly inclined needles 20 disposed in the annular groove 21, spins these fibers, and continuously removes such as a yarn 28. The yarn 28 is withdrawn without interruption from the hollow body member 9 over the deflecting roller 29 by means of the rollers 27a of the delivery device 27 and then delivered to a non-illustrated winding mechanism.

In so doing, the needles fulfill the function of limiting the extent of twist [ of the yarn at the beginning of the yarn, ] *propagation from the yarn just formed*, in other words, prevent the fibers 5 collected and lying in the annular groove 21 from being twisted *in* by the yarn *too early*. Formation of curls upon the individual fibers contacting the spun or completed yarn is prevented in that the individual fibers themselves move with approximately the same speed as the [ beginning ] *forming point* of the yarn in the annular groove 21. Thus, there is no differential *circumferential* speed between the delivered fibers and the *radial portion of the* withdrawn yarn, so that the individual fibers *while still air*

*borne* cannot be [ grasped ] *hit* by the yarn [ in the air ] *grasped* and [ curl ] *curled* about such yarn. Due to the acceleration of the fiber-air current the yarn tension is considerably reduced since there no longer appears air resistance in the direction of rotation of the hollow body member 9.

In FIG. 3 there is depicted a variant embodiment of *the* inventive spinning device. In this case, the feed porcupine roller 2' and the separation roller 39 correspond in function and physical structure to the corresponding rollers 2 and 3 of FIGS. 1 and 2. However, in this case the acceleration roller is dispensed with by virtue of an appropriate construction of the air channel 31. The housing 30 is also correspondingly constructed. Whereas the air channel 7 of FIG. 1 extends linearly from the acceleration roller 6 to the hollow body member 9, in this embodiment the air channel 31 is of ring-shaped or annular construction possessing a cross-section which narrows in the direction of the hollow body member. As a result, the fiber-air current guided from the separation roller 39 to the hollow body member is placed into rotation and simultaneously accelerated. It will be appreciated that the hollow body member is not visible in FIG. 3, since it is covered by the guide core 32, yet it will be appreciated that mounting of this hollow body member corresponds to the embodiment of FIG. 2. Moreover, the direction of rotation of such hollow body member is opposite the direction of rotation of the separation roller 39, indicated by the arrow G.

In FIG. 4 there is depicted the physical construction of an air channel 31, which in this embodiment does not guide the fiber-air current, as in the case of FIGS. 1 and 2 into an annular groove 34 of a hollow body member 35 by means of [ a limited opening, such as ] opening 8 of FIG. 1, rather in this case guides such fiber-air current through an annular or ring-shaped gap 33.

Additionally, in this embodiment the air is not *only* conveyed by [ blower means simultaneously revolving with ] the hollow body member, [ rather ] *but also* by means of a separate suction device or blower, schematically indicated at 50, to which a plurality of spinning devices can be connected. The suction stud or nipple 36 leads to this blower 50. The movement of the air is represented by the arrow H. Due to this suction a vacuum appears in the sealed hollow compartment 37, into which vacuum the air current cleaned or freed of fibers is [ sucked ] *removed* through the openings *or air ducts* 38 provided at the hollow body member 35. *The openings or air ducts 38 communicate with the inside of the hollow body member 35 at a location in the frontal wall 42 of the body member 35 which is radially spaced from the groove 34 to remove the air freed of fibers.* The remaining function is the same as already described in connection with FIGS. 1 and 2.

It will be appreciated that the fiber-air current leads from the separation roller 39 into the air channel 31. At this location it is placed into rotation by virtue of the spiral-shaped configuration of such air channel 31 and at the same time is accelerated, due to the narrowing of the cross-section of the aforesaid air channel, to a speed which completely or approximately corresponds to the peripheral speed of the annular groove 34 of the hollow body member 35. The fiber-air current is guided via the annular gap 33 which is open all around into the annular groove 34 of the hollow body member 35. Here the fibers are separated in the described manner from the fiber-air current, deposit themselves in the [ needle field 40 ] *groove* and are spun into a yarn 41. The air current freed of fibers is [ sucked ] *removed* through the openings 38 into the hollow compartment 37 and conducted via the suction nipple 36 to the blower 50.

While there are shown and described present preferred embodiments of the invention, it is to be distinctly understood that the invention is not limited thereto but may be otherwise variously embodied and practiced within the scope of the following claims.

What is claimed is:

1. A process for spinning staple fibers comprising the steps of:

a. continuously delivering a sliver to a separation roller, b. separating individual fibers from said sliver in said separation roller, c. accelerating the individual fibers by means of an air current surrounding these individual fibers approximately to the peripheral velocity of the inner wall of a *quickly rotating* hollow body member prior to delivery of said individual fibers to said hollow body member, d. then delivering said individual fibers approximately tangentially to the inner wall of [ a ] *the* quickly rotating hollow body member and forming thereat a fiber ring, e. and axially withdrawing a yarn out of said fiber ring.

[ 2. Apparatus for spinning staple fibers comprising a separation roller incorporating means for separating individual fibers from a sliver, a rotatable hollow body member for receiving the separated individual fibers, means for accelerating the individual fibers by means of their surrounding air prior to delivery to said rotatable hollow body member, and at least one rotatable acceleration roller for contributing to the acceleration of the individual fibers and surrounding air disposed between said separation roller and said hollow body member. ]

[ 3. Apparatus for spinning staple fibers as defined in claim 2, wherein said acceleration roller is provided with needles. ]

[ 4. Apparatus for spinning staple fibers as defined in claim 3, wherein said acceleration roller is provided with radial air passage means through which the air is conducted. ]

[ 5. Apparatus for spinning staple fibers as defined in claim 2, further including an air channel disposed between said acceleration roller and said hollow body member, said air channel possessing a cross-section which narrows from said acceleration roller in the direction of said hollow body member ]

[ 6. Apparatus for spinning staple fibers comprising a separation roller incorporating means for separating individual fibers from a sliver, a rotatable hollow body member for receiving the separated individual fibers, means for accelerating the individual fibers by means of their surrounding air prior to delivery to said rotatable hollow body member, and an air channel for contributing to the acceleration of the individual fibers and surrounding air extending between said separation roller and said hollow body member, said air channel possessing a cross-section which narrows from said separation roller in the direction of said hollow body member. ]

7. *Apparatus for spinning staple fibers comprising a separation roller incorporating means for separating individual fibers from a sliver, a rotatable hollow body member for receiving the separated individual fibers, a substantially V-shaped annular groove in said hollow member for collecting the individual fibers, one wall of said groove extending as a frontal wall inwardly towards the axis of rotation of the hollow body member, means for accelerating the individual fibers by means of their surrounding air prior to delivery to said rotatable hollow body member and at least one rotatable acceleration roller for contributing to the acceleration of the individual fibers and surrounding air disposed between said separation roller and said hollow body member, and a stationary air channel for feeding fibers to said hollow body member disposed between said acceleration roller and said hollow body member and having a discharge opening arranged for discharging the fibers into the groove from a side opposite said inwardly extending frontal wall.*

8. *Apparatus for spinning staple fibers as defined in claim 7, wherein said acceleration roller is provided with needles.*

9. *Apparatus for spinning staple fibers as defined in claim 8, wherein said acceleration roller is provided with radial air passage means through which the air is conducted.*

10. *Apparatus for spinning staple fibers as defined in claim 7, said air channel possessing a cross-section which narrows from said acceleration roller in the direction of said hollow body member.*

11. *An apparatus for spinning staple fibers including a separation roller incorporating means for combing out individual fibers from a sliver, a rotatable hollow body member for receiving the separated individual fibers, a substantially V-shaped annular groove in said hollow member for collecting the individual fibers, one wall of said groove extending as a frontal wall inwardly towards the axis of rotation of the hollow body member, and means for accelerating the individual fibers by means of their surrounding air prior to the delivery to said rotatable body member, and a stationary air channel for contributing to the acceleration of the individual fibers and the surrounding air extending between the separation roller and said hollow body member and having a discharge opening arranged for discharging the fibers into the groove from a side opposite said inwardly extending frontal wall in substantially tangential direction with respect to the groove and possessing a cross section which narrows from the separation roller in the direction of said hollow body member.*

12. *Apparatus for spinning staple fibers including a separation roller incorporating means for combing out individual fibers from a sliver, a rotatable hollow body member for receiving the separated individual fibers, a substantially V-shaped annular groove in said hollow member for collecting the individual fibers, one wall of said groove extending as a frontal wall inwardly towards the axis of rotation of the hollow body member, means for accelerating the individual fibers by means of their surrounding air prior to the delivery to said rotatable hollow body member, said accelerating means comprising outwardly extending air ducts communicating with the inside of the hollow body member at a location in the frontal wall radially spaced from the groove to remove the air freed of fibers, and a stationary air channel for feeding fibers to said hollow body member and for contributing to the acceleration of the individual fibers and the surrounding air extending between the separation roller and said hollow body member, said air channel having a discharge opening being arranged for discharging the fibers into the groove from a side opposite said inwardly extending frontal wall in tangential direction with respect to the groove and possessing a cross section which narrows from the separation roller in the direction of said hollow body member.*

13. *Apparatus for spinning staple fibers comprising*

*a separation roller incorporating means for separating individual fibers from a sliver;*

*a rotatable hollow body member for receiving the separated individual fibers, said member having an annular groove and a frontal wall extending inwardly towards the axis of rotation of said hollow body member; and*

*means for accelerating the individual fibers by means of their surrounding air prior to delivery to said rotatable hollow body member, said means including a stationary air channel for contributing to the acceleration of the individual fibers and surrounding air extending between said separation roller and said hollow body member, said air channel possessing a cross section which narrows from said separation roller in the direction of said hollow body member to deliver the individual fibers and surrounding air against said frontal wall whereby the fibers move into said groove and the fiber freed air is deflected radially inwardly along said frontal wall for removal therethrough.*

14. *Apparatus as set forth in claim 13 wherein said hollow body member further has air ducts on a side of said frontal wall opposite said annular groove for exhausting of the fiber freed air.*

15. *Apparatus as set forth in claim 13 wherein said hollow body member further includes openings in said frontal wall radially inwardly of said groove and which further comprises a suction device for exhausting of the fiber freed air through said openings.*

16. *Apparatus as set forth in claim 13 further comprising a housing having said separation roller and said stationary air channel mounted therein.*

17. *Apparatus as set forth in claim 16 wherein said means including said stationary air channel is a guide member removably mounted in said housing.*

18. *Apparatus as set forth in claim 16 which further comprises an acceleration roller mounted in said housing between said separation roller and said hollow body member.*

19. *Apparatus as set forth in claim 13 wherein said air channel is of annular construction.*

20. *Apparatus as set forth in claim 13 further comprising a centrally located opening in said frontal wall of said hollow body member and a hollow shaft extending through said opening for the removal of twisted fibers from said groove as a yarn.*

21. *Apparatus as set forth in claim 20 wherein said hollow shaft has a guide disk at one end for preventing the yarn from being sucked into said opening in said frontal wall.*

22. *Apparatus for spinning staple fibers including a separation roller incorporating means for combing out individual fibers from a sliver, a rotatable hollow body member for receiving the separated individual fibers, a substantially V-shaped annular groove in said hollow member for collecting the individual fibers, one wall of said groove extending as a frontal wall inwardly towards the axis of rotation of the hollow body member, and*

*means for accelerating the individual fibers by means of their surrounding air prior to delivery to said rotatable body member, said means for accelerating the surrounding air comprising suction creating means for subjecting the hollow body member to sub-atmospheric pressure and a stationary air channel for contributing to the acceleration of the individual fibers and the surrounding air stream extending between the separation roller and said hollow body member and having a discharge opening arranged opposite said frontal wall for discharging the fibers into the groove in substantially tangential direction with respect to the groove and possessing a cross-section which narrows from said separation roller in the direction of said hollow body member, said suction creating means being in unrestricted direct communication with the interior of the hollow body member.*

*23. Apparatus for spinning staple fibers including a separation roller incorporating means for combing out individual fibers from a sliver, a rotatable hollow body member for receiving the separated individual fibers, a substantially V-shaped annular groove in said hollow member for collecting the individual fibers, one wall of said groove extending as a frontal wall inwardly towards the axis of rotation of the hollow body member, and means for accelerating the individual fibers by means of their surrounding air prior to delivery to said rotatable body member, said means for accelerating the surrounding air comprising suction creating means for subjecting the interior of the hollow body member to sub-atmospheric pressure and a stationary air channel for contributing to the acceleration of the individual fibers and the surrounding air stream extending between the separation roller and said hollow body member and having a discharge opening arranged opposite said frontal wall for discharging the fibers into the groove in substantially tangential direction with respect to the groove and possessing a cross-section which narrows from said separation roller in the direction of said hollow body member, said suction creating means being in direct communication with the interior of the hollow body member.*

*24. Apparatus as set forth in claim 11, said means for accelerating the fibers further comprising a suction device for exhausting air from said rotatable body member.*

* * * * *